(12) United States Patent
Phillips

(10) Patent No.: US 9,022,891 B2
(45) Date of Patent: May 5, 2015

(54) TRIPLE CLUTCH MULTI-SPEED TRANSMISSION

(71) Applicant: GM Global Technology Operations LLC, Detroit, MI (US)

(72) Inventor: Andrew W. Phillips, Rochester, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 0 days.

(21) Appl. No.: 13/672,276

(22) Filed: Nov. 8, 2012

(65) Prior Publication Data
US 2014/0128212 A1    May 8, 2014

(51) Int. Cl.
| F16H 37/02 | (2006.01) |
| F16H 3/78  | (2006.01) |
| F16H 37/04 | (2006.01) |
| F16H 3/093 | (2006.01) |

(52) U.S. Cl.
CPC .......... *F16H 3/78* (2013.01); *F16H 2003/0931* (2013.01); *F16H 2200/006* (2013.01); *F16H 2200/0065* (2013.01); *F16H 2200/2005* (2013.01); *F16H 37/042* (2013.01)

(58) Field of Classification Search
None
See application file for complete search history.

(56) References Cited

U.S. PATENT DOCUMENTS

| 3,673,890 | A  | * | 7/1972  | Crooks           | 475/207 |
| 4,200,006 | A  | * | 4/1980  | Ehrlinger et al. | 475/219 |
| 4,726,258 | A  | * | 2/1988  | Hayashi et al.   | 475/209 |
| 6,645,105 | B2 | * | 11/2003 | Kima             | 475/5   |
| 6,893,373 | B2 | * | 5/2005  | Kawamoto et al.  | 475/302 |
| 7,311,630 | B2 | * | 12/2007 | Borgerson        | 475/215 |
| 7,427,252 | B2 | * | 9/2008  | Holmes           | 475/5   |
| 7,470,206 | B2 | * | 12/2008 | Rodgers, II      | 475/218 |
| 7,473,203 | B2 | * | 1/2009  | Ogata            | 475/209 |
| 7,695,390 | B2 | * | 4/2010  | Phillips         | 475/218 |
| 7,833,120 | B2 | * | 11/2010 | Yang             | 475/209 |
| 7,837,589 | B2 | * | 11/2010 | Earhart          | 475/302 |
| 8,043,187 | B2 | * | 10/2011 | Yang             | 475/218 |
| 8,075,436 | B2 | * | 12/2011 | Bachmann         | 475/5   |
| 8,123,647 | B2 | * | 2/2012  | Wenthen          | 475/218 |
| 8,439,787 | B2 | * | 5/2013  | Salamandra et al.| 475/207 |
| 8,579,751 | B2 | * | 11/2013 | Phillips         | 475/5   |
| 8,641,573 | B2 | * | 2/2014  | Ideshio et al.   | 475/218 |

* cited by examiner

*Primary Examiner* — Dirk Wright

(57) ABSTRACT

A transmission is disclosed having a planetary gear set with three input torque-transmitting mechanisms, such as friction clutches, to achieve torque flow through the planetary gear set to a countershaft gearing arrangement. The transmission includes an input member, an output member, a planetary gear set, an input clutch assembly having three input clutches and a countershaft gearing arrangement. The countershaft gearing arrangement is operatively connected with the planetary gear set and includes: at least three co-planar intermeshing gears, first and second countershafts, a first intermediate shaft and a second intermediate shaft concentric with the first intermediate shaft.

24 Claims, 2 Drawing Sheets

| GEAR STATE | GEAR RATIO | RATIO STEP | TORQUE TRANSMITTING ELEMENTS ||||||||| 
|---|---|---|---|---|---|---|---|---|---|---|---|
| | | | 76 | 72 | 74 | 80 | 94 | 90 | 96 | 92 | 98 |
| REV | -16.000 | | | | X | X | X | | | | |
| N | | -1.00 | | | | | | | | | |
| 1ST | 16.000 | | X | | | | X | | | | |
| 2ND | 10.000 | 1.60 | | | X | | | X | | | |
| 3RD | 7.692 | 1.30 | | X | | | | X | X | | |
| 4TH | 5.383 | 1.43 | X | | | | | | X | | |
| 5TH | 4.303 | 1.25 | | X | | | | | X | X | |
| 6TH | 3.222 | 1.34 | | | X | | | | | X | |
| 7TH | 2.611 | 1.23 | | X | | | | | | X | X |
| 8TH | 2.000 | 1.31 | X | | | | | | | | X |

X = ON - ENGAGED CARRYING TORQUE

| GEAR STATE | GEAR RATIO | RATIO STEP | TORQUE TRANSMITTING ELEMENTS | | | | | | | | |
|---|---|---|---|---|---|---|---|---|---|---|---|
| | | | 76 | 74 | 72 | 80 | 98 | 90 | 94 | 92 | 96 |
| REV | -16.000 | | | | | X | X | X | | | |
| N | | -1.00 | | | | | | | | | |
| 1ST | 16.000 | | X | | | | | X | | | |
| 2ND | 12.250 | 1.31 | | X | | | | X | X | | |
| 3RD | 8.500 | 1.44 | | | X | | | X | | | |
| 4TH | 6.912 | 1.23 | | X | | | | | X | X | |
| 5TH | 5.324 | 1.30 | X | | | | | | X | | |
| 6TH | 4.309 | 1.24 | | X | | | | | X | X | |
| 7TH | 3.293 | 1.31 | | | X | | | | | X | |
| 8TH | 2.647 | 1.24 | | X | | | | | | X | X |
| 9TH | 2.000 | 1.32 | X | | | | | | | | X |

X = ON - ENGAGED CARRYING TORQUE

TRIPLE CLUTCH MULTI-SPEED TRANSMISSION

TECHNICAL FIELD

The invention relates to a multi-speed transmission having a triple input clutch selectively connectable to a planetary gear set and a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio (with the exception of being able to achieve a direct drive ratio in a rear wheel drive application). Accordingly, the total number of gears required in this typical design is two times the number of forward speeds, plus three for reverse. This necessitates a large number of required gear pairs, especially in transmissions that have a relatively large number of forward speed ratios. Thus, a need exists for a more compact efficient transmission that utilizes gear pairs.

SUMMARY

A transmission is provided having a planetary gear set with triple input torque-transmitting mechanism, such as friction clutches, to achieve torque flow through the planetary gear set to a countershaft gearing arrangement. The transmission includes an input member, an output member, a planetary gear set, a triple input clutch assembly having a first, second and third torque-transmitting mechanisms and a countershaft gearing arrangement.

The planetary gear set has first, second and third members. The first, second and third torque-transmitting mechanisms of the triple input clutch assembly each are selectively engageable to connect the input member with a respective different one of the members of the planetary gear set.

The countershaft gearing arrangement is operatively connected with the planetary gear set and includes: three sets of co-planar intermeshing gears, a first intermediate shaft and a second intermediate shaft, a plurality of synchronizers and first and second countershafts. The first intermediate shaft is connected for common rotation with the sun gear member of the planetary gear set. The second intermediate shaft is connected for common rotation with the carrier member of the planetary gear set.

The first and second countershafts are radially offset from and typically parallel to the intermediate shafts. The plurality of synchronizers are selectively engagable to connect selected ones of the gears of the co-planar gear sets with selected ones of said shafts for common rotation to thereby transfer torque from the planetary gear set to the output members along the shafts and the sets of co-planar intermeshing gears.

Each of the countershafts has a countershaft transfer gear rotationally fixed to the respective countershaft. The countershaft transfer gears each mesh with an output transfer gear that is connected to the output member.

The planetary gear set may be a beveled gear set, a simple pinion or a double pinion (compound) planetary gear set.

In another aspect of the invention, a reverse torque ratio may be achieved by utilizing a brake that selectively connects the ring gear of the planetary gear set to a stationary member to obtain a reverse torque ratio, thus eliminating the need for a dedicated set of intermeshing gears.

Thus, the present invention reduces the number of layshaft gears required for a given number of different gear states by "re-using" some or all of the physical gears in more than one gear state.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
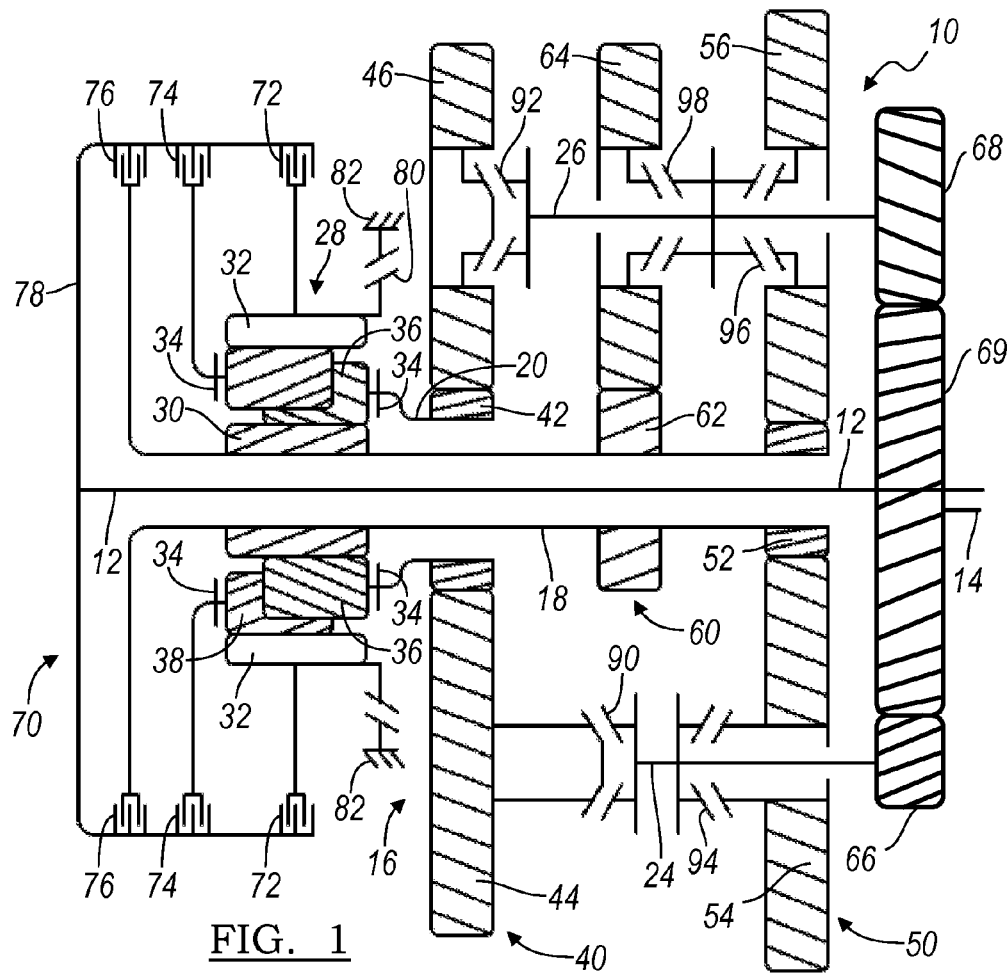
FIG. 1 is a schematic representation of an embodiment of an eight speed transmission in accordance with the present invention.
FIG. 2 is a truth table listing the engaged torque-transmitting mechanisms and synchronizers for selected torque ratios achieved by the eight speed transmission of FIG. 1.

Referring to the drawings, wherein like reference numbers refer to like components, in FIG. 1 a multi-speed transmission 10 is depicted. The transmission 10 includes an input member 12 and output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or to a turbine of a torque converter (not shown). The output shaft 14 is continuously connected with the final drive unit (not shown).

Transmission 10 includes a countershaft gearing arrangement 16 that includes intermediate shafts, a countershaft, co-planar intermeshing gear sets and selectively engagable synchronizers as will be described herein. For example, the countershaft gearing arrangement 16 includes a first intermediate shaft 18 and a second intermediate shaft 20. First and second intermediate shafts 18, 20 are sleeve shafts that are concentric with the input shaft 12. The countershaft gearing arrangement 16 further includes a first countershaft 24 and a second countershaft 26. Countershaft 24 is both spaced apart from and parallel with input shaft 12 and intermediate shafts 18 and 20. Countershaft 26 is both spaced apart from and parallel with input shaft 12 and intermediate shafts 18 and 20.

A planetary gear set 28, which is a compound planetary gear set, is connected between the input shaft 12 and the output shaft 14. The planetary gear set 28 includes sun gear member 30 connected for common rotation with the first intermediate shaft 18, a ring gear member 32 and a carrier member 34 which rotatably supports a first set of pinion gears 36 and a second set of pinion gears 38. First set of pinion gears 36 intermesh with both sun gear member 30 and the second set of pinion gears 38. Second set of pinion gears 38 intermesh with both ring gear member 32 and the first set of pinion gears 36.

The countershaft gearing arrangement 16 also includes co-planar, intermeshing gear sets 40, 50 and 60. Gear set 40 includes gears 42, 44 and 46. Gear 42 is connected for common rotation with second intermediate shaft 20 and intermeshes with gears 44 and 46. Gear 44 is rotatable about and selectively connectable with the first countershaft 24. Gear 46 is rotatable about and selectively connectable with the second countershaft 26.

Gear set 50 includes co-planar intermeshing gears 52, 54 and 56. Gear 52 is connected for common rotation with the first intermediate shaft 18 and intermeshes with gears 54 and 56. Gear 54 is rotatable about and selectively connectable with the first countershaft 24. Gear 56 is rotatable about and selectively connectable with the second countershaft 26.

Gear set 60 includes co-planar intermeshing gears 62 and 64. Gear 62 is connected for common rotation with the first intermediate shaft 18 and intermeshes with gear 64. Gear 64 is rotatable about and selectively connectable with the second countershaft 26.

Further, a first countershaft transfer gear 66 is rotatably fixed and connected for common rotation with the first countershaft 24. A second countershaft transfer gear 68 is rotatably fixed and connected for common rotation with the second countershaft 26. First countershaft transfer gear 66 and the second countershaft transfer gear 68 are each configured to mesh with an output transfer gear 69. The output transfer gear 69 is co-planar with first and second countershaft transfer gears 66, 68. However, the first countershaft transfer gear 66 and the second countershaft transfer gear 68 do not mesh with each other. The output transfer member 69 is attached and rotatably drives output shaft 14. Accordingly, torque transmitted to countershaft 24 is transferred to transfer gear 66 and on to output shaft 14 via output transfer gear 69 and torque transmitted to countershaft 26 is transferred to transfer gear 68 and on to output shaft 14 via output transfer gear 69.

The transmission 10 includes a triple input clutch or assembly 70 having three torque-transmitting mechanisms or devices including a first input clutch 72, second input clutch 74 and third input clutch 76. Triple input clutch or assembly 70 has a clutch housing 78 fixedly connected to the input shaft or member 12. Accordingly, first input clutch 72 is selectively engagable to connect the input shaft 12 with the ring gear member 32. Second input clutch 74 is selectively engagable to connect the input shaft 12 with the carrier member 34 and second intermediate shaft 20. Third input clutch 76 is selectively engagable to connect the input shaft 12 with the sun gear member 30 and first intermediate shaft 18.

Additionally, transmission 10 provides a brake member 80. Brake member 80 is selectively engagable to connect ring gear member 32 to a stationary member such as the transmission housing 82 to restrict rotation of the ring gear member 32.

The transmission 10 further includes a plurality of selectively engagable synchronizers 90, 92, 94, 96 and 98. Synchronizer 90 is selectively engagable to connect gear 44 with first countershaft 24 for common rotation therewith. Synchronizer 92 is selectively engagable to connect gear 46 with second countershaft 26 for common rotation therewith. Synchronizer 94 is selectively engagable to connect gear 54 with first countershaft 24 for common rotation therewith. Synchronizer 96 is selectively engagable to connect the gear 56 to second countershaft 26 for common rotation therewith. Synchronizer 98 is selectively engagable to connect the gear 64 to second countershaft 26 for common rotation therewith.

The transmission 10 is capable of transmitting torque from the input shaft 12 to the output shaft 14 in at least eight forward torque ratios and one reverse torque ratio as indicated in the truth table of FIG. 2. Each of the forward torque ratios and the reverse torque ratio is attained by engagement of one of the first, second, third torque-transmitting mechanisms or input clutches 72, 74, 76, brake 80 and one or more of the synchronizers 90, 92, 94, 96 and 98. Those skilled in the art will readily understand that a different speed ratio is associated with each torque ratio. Thus, eight forward speed ratios may be attained by the transmission 10.

To establish the reverse torque ratio (Gear State Rev 1), the input clutches, brake and synchronizers are selected as set forth in the table of FIG. 2. More specifically, input clutch 74, brake 80 and synchronizer 94 are engaged. The input clutch 74 connects the carrier member 34 with the input shaft 12. Synchronizer 94 connects gear 54 for common rotation with first countershaft 24. Brake 80 connects ring gear 32 with transmission housing 82 for braking and preventing the rotation of ring gear 32. Torque is thus transferred from the input shaft 12 through the sun gear member 30 to first intermediate shaft 18 to gear 52. Torque is transferred from gear 52 to first countershaft 24 through synchronizer 94. Torque is then transferred from first countershaft 24 to the first countershaft transfer gear 66. First countershaft transfer gear 66 transfers the torque to the output shaft 14 via the output transfer gear 69.

A first forward torque ratio (Gear State 1st in the truth table of FIG. 2), is achieved by engaging the input clutch 76 and synchronizer 94. The input clutch 76 connects the sun gear member 30 with the input shaft 12. Synchronizer 94 connects gear 54 for common rotation with first countershaft 24. Torque is thus transferred from the sun gear member 30 to first intermediate shaft 18 to gear 52. Torque is transferred from gear 52 to first countershaft 24 through synchronizer 94. Torque is then transferred from first countershaft 24 to the first countershaft transfer gear 66. First countershaft transfer gear 66 transfers the torque to the output shaft 14 via the output transfer gear 69.

A subsequent forward torque ratio, indicated as Gear State 2nd in FIG. 2, is established by engagement of input clutch 74 and synchronizer 90. The input clutch 74 connects the carrier member 34 with the input shaft 12. Synchronizer 90 connects gear 44 for common rotation with first countershaft 24. Torque is transferred from the input shaft 12 to the carrier member 34 via the engaged input clutch 74. Torque then flows from the carrier member 34 to second intermediate shaft 20. Torque is transferred from second intermediate shaft 20 to gear 42. Torque is transferred from gear 42 to gear 44 and from synchronizer 90 to first countershaft 24. Torque is then transferred from first countershaft 24 to the first countershaft transfer gear 66. First countershaft transfer gear 66 transfers the torque to the output shaft 14 via the output transfer gear 69.

The subsequent torque ratio, indicated as Gear State 3rd in the truth table of FIG. 2, is established by the engagement of the input clutch 72 and synchronizers 90 and 96. The input clutch 72 connects the ring gear 32 with the input shaft 12. Synchronizer 96 connects gear 56 for common rotation with second countershaft 26. Torque is transferred from the input shaft 12 to the ring gear 32 via the engaged input clutch 72. Torque then flows from the ring gear 32 to carrier member 34. Torque is transferred from carrier member to sun gear 30 and to second intermediate shaft 20. Torque is transferred from sun gear 30 to gear 52 via first intermediate shaft 18 and to gear 42 from second intermediate shaft 20. First intermediate shaft 18 transfers the torque to gear 52. Gear 42 transfers the torque to gear 44 and gear 52 transfers the torque to gear 54. Gear 44 transfers the torque to first countershaft 24 via synchronizer 90 and gear 54 transfers the torque to second countershaft 26 via synchronizer 96. Torque is then transferred from first countershaft 24 to the first countershaft transfer gear 66 from first countershaft 24 to the first countershaft transfer gear 66 and from second countershaft 26 to the second countershaft transfer gear 68. First and second countershaft transfer gears 66, 68 transfer the torque to the output shaft 14 via the output transfer gear 69.

The next subsequent forward torque ratio, indicated as Gear State 4th in the truth table of FIG. 2, is established with the engagement of the input clutch 76 and synchronizer 96. The input clutch 76 connects the sun gear 30 with the input shaft 12. Synchronizer 96 connects gear 56 for common rotation with second countershaft 26. Torque is transferred from the input shaft 12 to the sun gear 30 via the engaged input clutch 76. Torque then flows from the sun gear 30 to gear 52 via first intermediate shaft 18. Gear 52 transfers the torque to gear 54. Gear 54 transfers the torque to second countershaft 26 via synchronizer 96. Torque is then transferred from second countershaft 26 to the second countershaft transfer gear 68. Second countershaft transfer gear 68 transfers the torque to the output shaft 14 via the output transfer gear 69.

A subsequent forward torque ratio indicated as Gear State 5th in FIG. 2, is established with the engagement of input clutch 72 and synchronizers 92 and 96. The input clutch 72 connects the ring gear 32 with the input shaft 12. Synchronizer 92 connects gear 46 for common rotation with second countershaft 26. Synchronizer 96 connects gear 56 for common rotation with second countershaft 26. Torque is transferred from the input shaft 12 to the ring gear 32 via the engaged input clutch 72. Torque then flows from the ring gear 32 to carrier member 34. Torque is transferred from carrier member 34 to gear 42 via second intermediate shaft 20 and to sun gear 30. Sun gear 30 transfers the torque to gear 52 via first intermediate shaft 18. Gear 42 transfers the torque to gear 46 and gear 52 transfers the torque to gear 56. Gear 46 transfers the torque to second countershaft 26 via synchronizer 92 and gear 56 transfers the torque to second countershaft 26 via synchronizer 96. Torque is then transferred from second countershaft 26 to the output shaft 14. Torque is then transferred from second countershaft 26 to the second countershaft transfer gear 68. Second countershaft transfer gear 68 transfers the torque to the output shaft 14 via the output transfer gear 69.

A subsequent forward torque ratio indicated as Gear State 6th in the truth table of FIG. 2 is established with the engagement of input clutch 74 and synchronizer 92. The input clutch 74 connects the carrier member 34 with the input shaft 12. Synchronizer 92 connects gear 46 for common rotation with second countershaft 26. Torque is transferred from the input shaft 12 to the carrier member 34 via the engaged input clutch 74. Torque then flows from the carrier member to gear 42 via second intermediate shaft 20. Gear 42 transfers the torque to gear 46. Gear 46 transfers the torque to second countershaft 26 via synchronizer 92. Torque is then transferred from second countershaft 26 to the second countershaft transfer gear 68. Second countershaft transfer gear 68 transfers the torque to the output shaft 14 via the output transfer gear 69.

A subsequent forward torque ratio indicated as Gear State 7th in FIG. 2, is established with the engagement of input clutch 72 and synchronizers 92 and 98. The input clutch 72 connects the ring gear 32 with the input shaft 12. Synchronizer 92 connects gear 46 for common rotation with second countershaft 26. Synchronizer 98 connects gear 64 for common rotation with second countershaft 26. Torque is transferred from the input shaft 12 to the ring gear 32 via the engaged input clutch 72. Torque then flows from the ring gear 32 to carrier member 34. Torque is transferred from carrier member 34 to gear 42 via second intermediate shaft 20 and to sun gear 30. Sun gear 30 transfers the torque to gear 62 via first intermediate shaft 18. Gear 42 transfers the torque to gear 46 and gear 62 transfers the torque to gear 64. Gear 46 transfers the torque to second countershaft 26 via synchronizer 92 and gear 64 transfers the torque to second countershaft 26 via synchronizer 98. Torque is then transferred from second countershaft 26 to the second countershaft transfer gear 68. Second countershaft transfer gear 68 transfers the torque to the output shaft 14 via the output transfer gear 69.

The next subsequent forward torque ratio, indicated as Gear State 8th in the truth table of FIG. 2, is established with the engagement of the input clutch 76 and synchronizer 98. The input clutch 76 connects the sun gear 30 with the input shaft 12. Synchronizer 98 connects gear 64 for common rotation with second countershaft 26. Torque is transferred from the input shaft 12 to the sun gear 30 via the engaged input clutch 76. Torque then flows from the sun gear 30 to gear 62 via first intermediate shaft 18. Gear 62 transfers the torque to gear 64. Gear 64 transfers the torque to second countershaft 26 via synchronizer 96. Torque is then transferred from second countershaft 26 to the second countershaft transfer gear 68. Second countershaft transfer gear 68 transfers the torque to the output shaft 14 via the output transfer gear 69.

The present invention contemplates that downshifts follow essentially the reverse sequence of the corresponding upshift (as described above), and several power-on skip-shifts are possible.

Figures 3, 4:
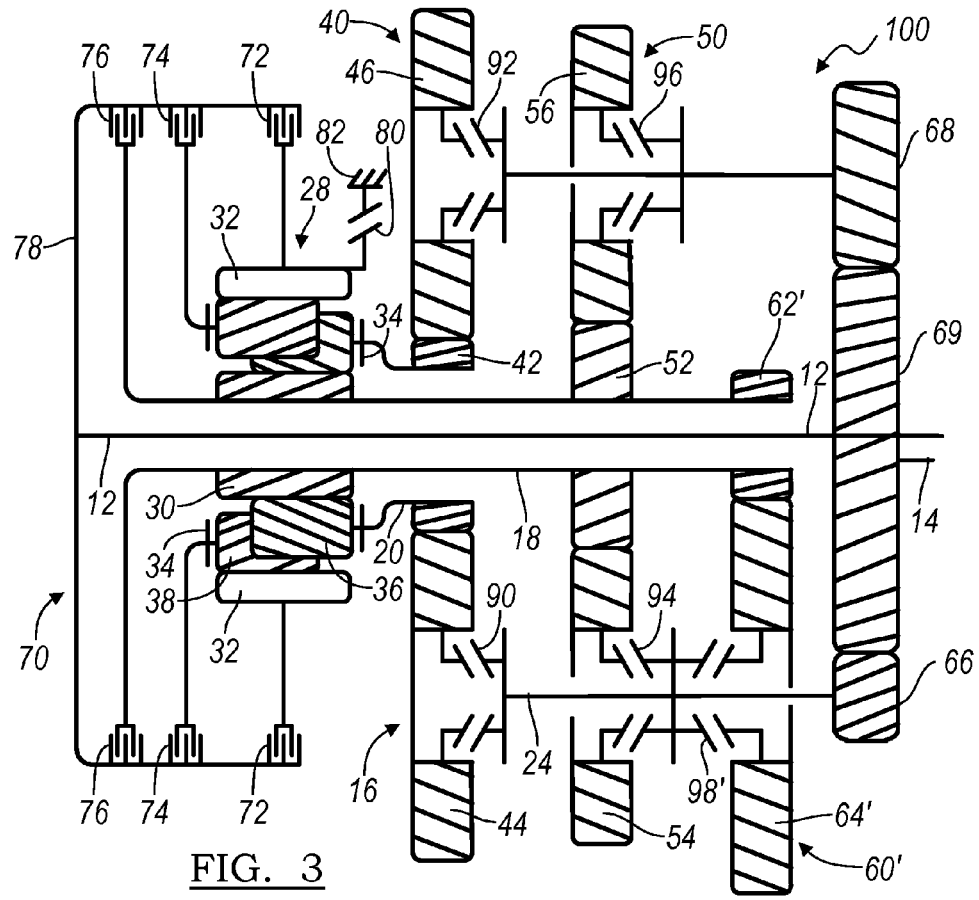
FIG. 3 is a schematic representation of an embodiment of a nine speed transmission in accordance with the present invention.
FIG. 4 is a truth table listing the state of engagement of the torque-transmitting mechanisms and synchronizers for selected torque ratios achieved by the nine speed transmission of FIG. 3.

Referring now to FIG. 3 a nine speed transmission 100 is depicted according to the principles of the invention. The transmission 100 has the same components as described previously with respect to transmission 10 and as indicated in FIG. 3 with like reference numbers. However, transmission 100 has a different arrangement for co-planar gear set 60, herein referenced as co-planar gear set 60'. Co-planar gear set 60' is now located furthest from input clutch 70. More specifically, gear set 60' includes co-planar intermeshing gears 62' and 64'. Gear 62' is connected for common rotation with the first intermediate shaft 18 and intermeshes with gear 64. Gear 64 is rotatable about and selectively connectable with the first countershaft 24 instead of second countershaft 26, as described above with respect to transmission 10. Synchronizer 98' selectively engages gear 64' to first countershaft 24 for common rotation therewith instead of selectively connecting gear 64 to second countershaft 26, as described above with respect to transmission 10.

The transmission 100 is capable of transmitting torque from the input shaft 12 to the output shaft 14 in at least nine forward torque ratios and one reverse torque ratio as indicated in the truth table of FIG. 4. Each of the forward torque ratios and the reverse torque ratio is attained by engagement of one of the first, second, third torque-transmitting mechanisms or input clutches 72, 74, 76, brake 80 and one or more of the synchronizers 90, 92, 94, 96 and 98 as indicated by an "X" in the columns of the truth table of FIG. 4. Those skilled in the art will readily understand that a different speed ratio is associated with each torque ratio. Thus, nine forward speed ratios may be attained by the transmission 100.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a planetary gear set having first, second and third members;
   a clutch assembly having a first, a second and a third torque-transmitting mechanism each selectively engageable to connect the input member with a respective different one of the members of the planetary gear set;
   a first intermediate shaft connected for common rotation with the first member of said planetary gear set;
   a second intermediate shaft connected for common rotation with the second member of said planetary gear set, wherein the second intermediate shaft is concentric with the first intermediate shaft;
   a first countershaft radially offset from the intermediate shafts;
   a second countershaft radially offset from the intermediate shafts;
   a first countershaft transfer gear connected for common rotation with the first countershaft and in communication with the output member to transfer torque from the first countershaft to the output member;
   a second countershaft transfer gear connected for common rotation with the second countershaft and in communication with the output member to transfer torque from the second countershaft to the output member;
   and further consisting of three co-planar intermeshing gear sets, wherein one of the gears of only one of the three co-planar intermeshing gear sets is fixed for common rotation with one of the intermediate shafts and wherein one of the gears of the two other co-planar intermeshing gear sets is fixed for common rotation with the other of the intermediate shafts; and
   a plurality of synchronizers, wherein at least one of the plurality of synchronizers is selectively engagable to connect at least one of the gears of the three co-planar intermeshing gear sets with at least one of the first and second countershafts for common rotation therewith, thereby transferring torque from the planetary gear set to at least one of the first and second countershaft transfer gears through at least one of the intermediate shafts and at least one of the sets of co-planar intermeshing gear sets.

2. The transmission of claim 1 wherein the first member of the planetary gear set is a sun gear, the second member of the planetary gear set is a planet carrier member and third member of the planetary gear set is a ring gear.

3. The transmission of claim 2 wherein the planet carrier member rotatably supports a first and second set of planet gears and wherein the first set of planet gears intermeshes with the sun gear and the second set of planet gears and the second set of planet gears intermeshes with the ring gear and the first set of planet gears.

4. The transmission of claim 2 wherein the first intermediate shaft is connected for common rotation with sun gear of the planetary gear set.

5. The transmission of claim 2 wherein the second intermediate shaft is connected for common rotation with the planet carrier member of said planetary gear set.

6. The transmission of claim 2 wherein the first torque-transmitting mechanism is selectively engageable to connect the input member with the ring gear of the planetary gear set, the second torque-transmitting mechanism is selectively engageable to connect the input member with the planet carrier of the planetary gear set and the third torque-transmitting mechanism is selectively engageable to connect the input member with the sun gear of the planetary gear set.

7. The transmission of claim 1 wherein two of the three co-planar intermeshing gears each include a first gear in mesh with a second and third gear.

8. The transmission of claim 7 wherein one of the three co-planar intermeshing gears includes a first gear in mesh with a second gear.

9. The transmission of claim 8 wherein the second gears of two of the three co-planar intermeshing gear sets are selectively engageable with the first countershaft and the second gear of the remaining one of the three co-planar intermeshing gear sets is selectively engageable with the second countershaft.

10. The transmission of claim 1 wherein the plurality of synchronizers further includes a first synchronizer for selectively connecting a second gear of a first of the three co-planar intermeshing gear sets with the first countershaft.

11. The transmission of claim 10 wherein the plurality of synchronizers further includes a second synchronizer for selectively connecting a third gear of the first of the three co-planar intermeshing gear sets with the second countershaft.

12. The transmission of claim 11 wherein the plurality of synchronizers further includes a third synchronizer for selectively connecting a second gear of a second of the three co-planar intermeshing gear sets with the first countershaft.

13. The transmission of claim 12 wherein the plurality of synchronizers further includes a fourth synchronizer for selectively connecting a third gear of the second of the three co-planar intermeshing gear sets with the second countershaft.

14. The transmission of claim 13 wherein the plurality of synchronizers further includes a fifth synchronizer for selectively connecting a second gear of a third of the three co-planar intermeshing gear sets with the second countershaft.

15. The transmission of claim 1 wherein the output member further includes an output transfer gear in mesh with each of the first and second countershaft transfer gears.

16. The transmission of claim 1 wherein two of the at least three co-planar intermeshing gears each include a first gear in mesh with a second and third gear.

17. A transmission comprising:
    an input member;
    an output member;
    a planetary gear set having a sun gear, a carrier member and a ring gear, wherein the carrier member rotatably supports a first and second set of planet gears and wherein the first set of planet gears intermeshes with the sun gear and the second set of planet gears and the second set of planet gears intermeshes with the ring gear and the first set of planet gears;
    a clutch assembly having a first, a second and a third clutch, wherein the first clutch is selectively engageable to connect the input member with the ring gear of the planetary gear set, the second clutch is selectively engageable to connect the input member with the carrier member of the planetary gear set and the third clutch is selectively engageable to connect the input member with the sun gear of the planetary gear set;
    a first intermediate shaft connected for common rotation with the sun gear of the planetary gear set, wherein the first intermediate shaft is concentric with the input shaft;

a second intermediate shaft connected for common rotation with the carrier member of the planetary gear set, wherein the second intermediate shaft is concentric with the first intermediate shaft;

a first countershaft radially offset from the intermediate shafts and in communication with the output member;

a second countershaft radially offset from the intermediate shafts and in communication with the output member;

and further consisting of a first, second and third co-planar intermeshing gear sets, wherein the first and second co-planar intermeshing gear sets each having a first gear intermeshing with a second and third gear and third co-planar intermeshing gear set has a first gear intermeshing with second gear, wherein the first gears of the second and third co-planar intermeshing gear sets are fixed for common rotation with the first intermediate shaft and the first gear of the first co-planar intermeshing gear sets is fixed for common rotation with the second intermediate shaft; and a plurality of synchronizers, wherein at least one of the plurality of synchronizers is selectively engagable to connect at least one of the gears of the first, second and third co-planar intermeshing gear sets with at least one of the first and second countershafts for common rotation therewith, thereby transferring torque from the planetary gear set to at least one of the first and second countershafts through at least one of the first and second intermediate shafts.

18. The transmission of claim 17 wherein the plurality of synchronizers further includes a first synchronizer for selectively connecting the second gear of the first co-planar intermeshing gear sets with the first countershaft.

19. The transmission of claim 18 wherein the plurality of synchronizers further includes a second synchronizer for selectively connecting the third gear of the first co-planar intermeshing gear sets with the second countershaft.

20. The transmission of claim 19 wherein the plurality of synchronizers further includes a third synchronizer for selectively connecting the second gear of the second co-planar intermeshing gear sets with the first countershaft.

21. The transmission of claim 20 wherein the plurality of synchronizers further includes a fourth synchronizer for selectively connecting the third gear of the second co-planar intermeshing gear sets with the second countershaft.

22. The transmission of claim 21 wherein the plurality of synchronizers further includes a fifth synchronizer for selectively connecting the second gear of the third of the co-planar intermeshing gear sets with the second countershaft.

23. The transmission of claim 17 further comprising first and second countershaft transfer gears, wherein the first countershaft transfer gear is rotatably fixed for common rotation with the first countershaft and the second countershaft transfer gear is rotatably fixed for common rotation with the second countershaft.

24. The transmission of claim 23 wherein the output member further includes an output transfer gear in mesh with each of the first and second countershaft transfer gears.

* * * * *